(12) United States Patent
Christensson et al.

(10) Patent No.: US 10,986,628 B2
(45) Date of Patent: Apr. 20, 2021

(54) METHOD AND COMMUNICATIONS NETWORK FOR ASSIGNING ENHANCED PHYSICAL DOWNLINK CONTROL CHANNEL RESOURCES

(71) Applicant: Telefonaktiebolaget LM Ericsson (publ), Stockholm (SE)

(72) Inventors: Anders Christensson, Älvsjö (SE); Anders Johansson, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/756,785

(22) PCT Filed: Sep. 25, 2015

(86) PCT No.: PCT/SE2015/051008
§ 371 (c)(1),
(2) Date: Mar. 1, 2018

(87) PCT Pub. No.: WO2017/052435
PCT Pub. Date: Mar. 30, 2017

(65) Prior Publication Data
US 2018/0242318 A1    Aug. 23, 2018

(51) Int. Cl.
*H04W 72/04*    (2009.01)
*H04W 52/02*    (2009.01)

(52) U.S. Cl.
CPC ... *H04W 72/0446* (2013.01); *H04W 52/0206* (2013.01); *H04W 72/0486* (2013.01); *Y02D 30/70* (2020.08)

(58) Field of Classification Search
CPC ......... H04W 72/0446; H04W 72/0486; H04W 52/0206; Y02D 70/21; Y02D 70/23; Y02D 70/1262
USPC ........................................................ 370/329
See application file for complete search history.

(56) References Cited

U.S. PATENT DOCUMENTS

| | | | |
|---|---|---|---|
| 9,320,023 B2 * | 4/2016 | Nory | H04W 74/0833 |
| 2013/0114419 A1 * | 5/2013 | Chen | H04W 72/044 370/248 |
| 2013/0250882 A1 * | 9/2013 | Dinan | H04L 5/0032 370/329 |

(Continued)

FOREIGN PATENT DOCUMENTS

| | | | | |
|---|---|---|---|---|
| WO | 2014032724 A1 | 3/2014 | | |
| WO | WO-2014032724 A1 * | 3/2014 | | H04W 72/1289 |

*Primary Examiner* — Michael J Moore, Jr.
*Assistant Examiner* — Mohammed S Chowdhury
(74) *Attorney, Agent, or Firm* — Patent Portfolio Builders, PLLC

(57) ABSTRACT

A method (40) performed in a communications network (1) is provided for assigning, in a cell (9), enhanced physical downlink control channel, EPDCCH, resources used in the communications network (1) for transmitting scheduling assignments. The method (40) comprises obtaining (41) a EPDCCH subframe pattern that is based on load in the cell (9), wherein the subframe pattern indicates EPDCCH enabled subframes and non-EPDCCH enabled subframes, and assigning (42) EPDCCH resources to a wireless device (3) according to the obtained EPDCCH subframe pattern. A corresponding communications network (1) is provided, and computer programs and computer program products.

15 Claims, 8 Drawing Sheets

(56) References Cited

U.S. PATENT DOCUMENTS

2014/0192759 A1* 7/2014 Son ................... H04W 72/0426
 370/329
2016/0081111 A1* 3/2016 Yi ........................... H04L 5/005
 370/280
2018/0014281 A1* 1/2018 Takeda .................. H04W 74/08

* cited by examiner

METHOD AND COMMUNICATIONS NETWORK FOR ASSIGNING ENHANCED PHYSICAL DOWNLINK CONTROL CHANNEL RESOURCES

TECHNICAL FIELD

The technology disclosed herein relates generally to the field of wireless communication networks and in particular to methods, communications network, computer programs and computer program products for assigning enhanced physical downlink control channel resources.

BACKGROUND

Long Term Evolution (LTE) is a radio access technology standardized by 3$^{rd}$ Generation Partnership Project (3GPP). Only the Packed Switched domain is supported by LTE, i.e., there is no Circuit Switched domain as in previous 3GPP systems. The standard is based on Orthogonal Frequency Division Multiplexing (OFDM) in a downlink direction (from network node to user terminal) and Single Carrier-Frequency Division Multiple access (SC-FDMA) in an uplink direction (from user terminal to network node).

The power consumption of the LTE network is a major operating cost for the operators thereof, and hence energy-efficiency is of utmost importance. Operators' energy operating expenses (OPEX), comprising maintenance, power etc., is expected to continue to increase and the energy performance of network nodes such as evolved NodeBs (eNodeBs) as well as other entities of the network may be a sales advantage. Energy-efficiency is important also for other reasons, e.g. from an environmental point of view. Ways of rendering communications networks as energy-efficient as possible, e.g. by further reducing energy consumption, are therefore needed. However, it is also important to keep user satisfaction and energy-saving features should be provided without degrading performance in the network or affecting user experience. This is therefore also an important aspect when developing energy-saving features.

SUMMARY

An objective of the present teachings is to address the above issues, and provide improvements in view of energy performance in a communications network.

The objective is according to an aspect achieved by a method in performed in a communications network for assigning, in a cell, enhanced physical downlink control channel, EPDCCH, resources used in a communications network for transmitting scheduling assignments. The method comprises obtaining a EPDCCH subframe pattern that is based on load in the cell, wherein the subframe pattern indicates EPDCCH enabled subframes and non-EPDCCH enabled subframes, and assigning EPDCCH resources to a wireless device according to the obtained EPDCCH subframe pattern.

An advantage of the method is that it provides an improved energy performance by enabling efficient utilization of energy-saving features in an EPDCCH enabled cell. Such energy-saving features may, for instance, comprise turning off power amplifiers of a transmitter part. The method also enable improved subframe blanking decisions to be made for cells with both non-EPDCCH and EPDCCH subframes. Still further, the method allows EPDCCH functionality to be utilized even during low or moderate load situations by allocating load dependent EPDCCH subframe patterns.

The objective is according to an aspect achieved by a computer program for a communications network for assigning enhanced physical downlink control channel, EPDCCH, resources. The computer program comprises computer program code, which, when executed on at least one processor on the communications network causes communications network to perform the method as above.

The objective is according to an aspect achieved by a computer program product comprising a computer program as above and a computer readable means on which the computer program is stored.

The objective is according to an aspect achieved by a communications network for assigning, in a cell, enhanced physical downlink control channel, EPDCCH, resources used in a communications network for transmitting scheduling assignments. The communications network is configured to obtain a EPDCCH subframe pattern that is based on load in the cell, wherein the subframe pattern indicates EPDCCH enabled subframes and non-EPDCCH enabled subframes, and to assign EPDCCH resources to a wireless device according to the obtained EPDCCH subframe pattern.

Further features and advantages of the embodiments according to the present teachings will become clear upon reading the following description and the accompanying drawings.

DETAILED DESCRIPTION

Figure 1:
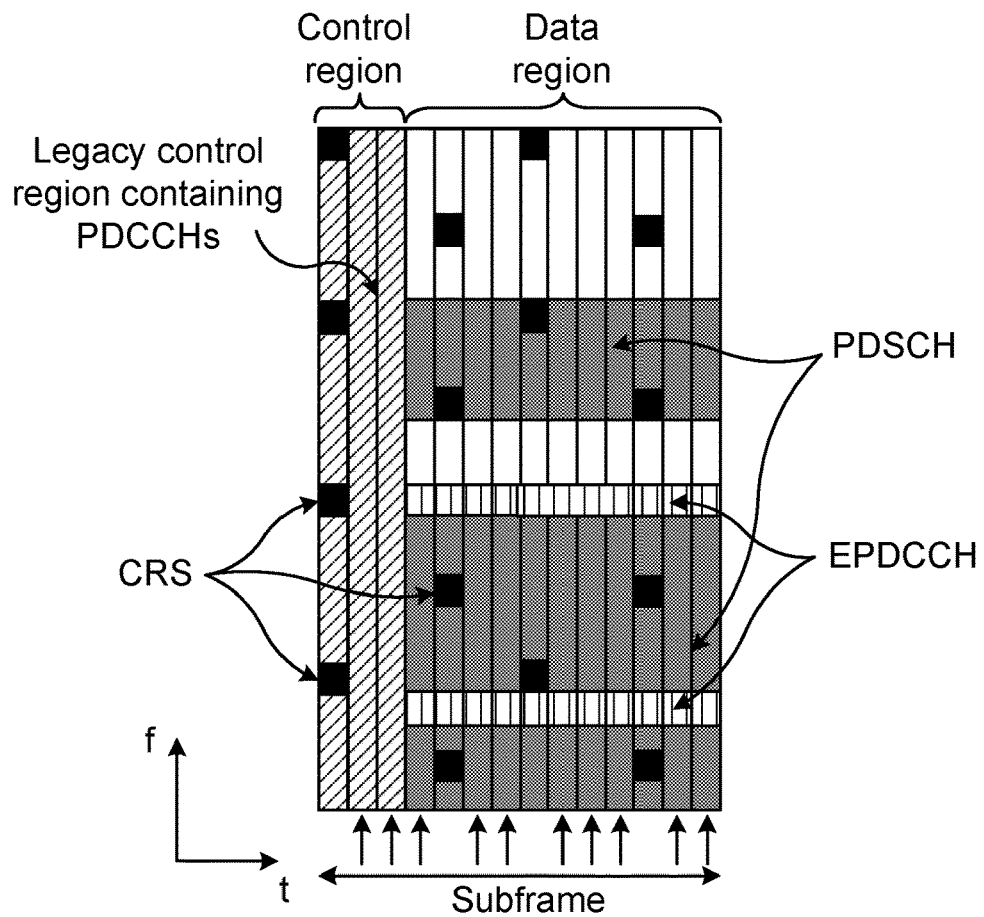
FIG. 1 illustrates schematically mapping of LTE channels in one subframe.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide thorough understanding of the present teachings, some aspects of LTE radio access technology are initially described. Further, an energy-saving opportunity, discovered by the inventors behind the present teachings, is also described with reference to FIG. 1.

FIG. 1 illustrates schematically a subframe and mapping of channels in the subframe. In the downlink, using OFDM, the transmission is divided into subframes of length 1 ms. Each subframe is typically divided into 14 OFDM symbols in the time domain (time along x-axis) in the downlink, and one OFDM symbol then consists of a number of sub-carriers in the frequency domain (frequency along y-axis). The first one, two, three or four OFDM symbols of the subframe are used to transmit a downlink control channel denoted Physical Downlink Control Channel (PDCCH) which carries information on scheduling of data in both downlink and uplink, e.g., user equipment (UE) specific scheduling assignments in downlink, resource allocation, uplink grants, etc. These OFDM symbols (3 in the example of FIG. 1) constitute a control region of the subframe. The remaining part of the downlink subframe, i.e., the remaining OFDM symbols (11 in the example of FIG. 1), is used to transmit downlink data. The subframe (14 OFDM symbols) is the smallest resource unit that can be allocated to the UE.

The downlink data is transmitted on a channel denoted Physical Downlink Shared Channel (PDSCH). On some of the OFDM symbols there are also cell-specific reference symbols (CRS) present. In the example of FIG. 1, 16 such CRSs are illustrated (three of which are indicated by arrows).

In LTE Release 11 (Rel-11) a new downlink control channel, denoted Enhanced PDCCH (EPDCCH), was added to the standard. This channel may be used to transmit UE-specific scheduling assignments for those UEs that are EPDCCH capable. The EPDCCH channel is multiplexed with the PDSCH covering all the OFDM symbols in the subframe except for the control region used by PDCCH, as illustrated in FIG. 1. The EPDCCH resources are thus multiplexed with data in one or more OFDM symbols.

There are several use cases for EPDCCH such as providing increased control channel capacity, control channel inter-cell interference cancellation (ICIC) support for Heterogeneous Networks (HetNets) and Combined Cell, and control channel beamforming. The increased control channel capacity is of particular interest since the legacy PDCCH capacity is a bottleneck in many scenarios, e.g. for applications such as Voice over LTE (VoLTE) which comprise many small packages to be sent and hence scheduled, requiring large parts of the PDCCH capacity.

An EPDCCH capable UE can be configured to monitor EPDCCH for UE specific scheduling assignments in all subframes or only in some of the subframes. The UEs are then semi-statically assigned EPDCCH resources using radio resource control (RRC) signaling. Similar to PDCCH there are also typically multiple EPDCCHs in each subframe and the UEs will be required to monitor the EPDCCHs to be able to detect the UE-specific assignments directed to them and in that way being able to "find" the data directed to them. The UE-specific assignments may be seen as "pointers" to a particular set of resource elements where the data is actually sent. In the subframes where the UE is monitoring EPDCCH for UE specific assignment the legacy PDCCH is only monitored for common DL scheduling assignments such as e.g. system information blocks (SIBs), paging and Random Access (RA) response messages (also denoted RA message 2).

Differences between EPDCCH and PDCCH are that EPDCCH is only used for UE-specific assignments and is multiplexed with PDSCH, while PDCCH can be used for both UE-specific and common assignments and is located in the control region in the beginning of each subframe. Additionally, the EPDCCH is more flexible than the PDCCH allowing for e.g. dynamic capacity, beamforming and ICIC, which is not possible for PDCCH. For instance, since the EPDCCH is multiplexed with the PDSCH in the data region, and is UE specific, beamforming may be applied for the EPDCCH.

In the LTE base stations, the eNodeBs, the energy efficiency is of high importance for the operators since power consumption is one of the major operating costs e.g. for a macro base station. The largest part of the power is consumed by power amplifiers (PA) in the transmitter part of the radio in the eNodeB.

A function, in the following denoted "Micro Sleep Tx", is used to enable a reduction of energy consumption, in particular in the eNodeB. The Micro Sleep Tx function powers off devices, for instance the power amplifier (PA) gate biasing, during OFDM symbols that carry no data. Some of the LTE downlink signals/downlink channels are mandatory and will always be present and will hence also inhibit the use of Micro Sleep Tx. These channels/signals are CRS, physical control format indicator channel (PCFICH), physical broadcast channel (PBCH), primary synchronization signal (PSS) and secondary synchronization signal (SSS). PBCH, PSS and SSS are only present in one subframe out of 10, and are furthermore only transmitted in 2 or 4 OFDM symbols, for PSS/SSS and PBCH respectively, in those subframes. PCFICH is always present in one OFDM symbol in each subframe and CRS is present in 4 OFDM symbols in each subframe (2Tx port case). One of the OFDM symbols carrying CRS overlap with the OFDM symbol carrying PCFICH. To summarize, this implies that there is a potential to apply Micro Sleep Tx in 8 to 10 out of 14 OFDM symbols in most of the subframes, as illustrated in FIG. 1 by the arrows (ten arrows) in the lower-most part of the figure. The arrows indicate OFDM symbols not carrying CRSs, during which the Micro Sleep Tx could be applied. Two of these arrows are pointing at OFDM symbols in the control region and 8 are pointing at OFDM symbols in the data region. The main part of these 8 to 10 symbols is the region shared by PDSCH and EPDCCH.

The Micro Sleep Tx function provides large energy savings during low load since many subframes are sent entirely empty of PDSCH data. A requirement for Micro Sleep Tx to become enabled is that the subframe is empty of PDSCH data.

The Micro Sleep Tx function may be used when there is no or possibly little traffic scheduled in the downlink. Micro Sleep Tx is therefore mainly a low load feature. Such low load situation is however a traffic scenario of high interest, since the average amount of traffic in the eNodeB is low although the traffic variations are large.

Figure 2:
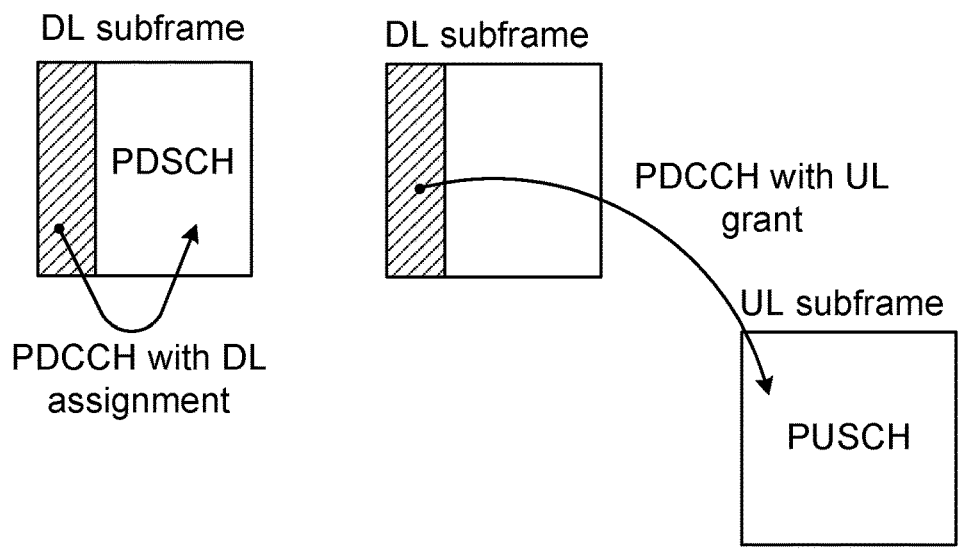
FIG. 2 illustrates use of PDCCH for downlink assignments and uplink grants.

FIG. 2 illustrates the use of PDCCH for downlink assignments and uplink grants. When PDCCH is used for scheduling downlink assignments there is no benefit for the Micro Sleep Tx function since PDSCH will allocate data in all OFDM symbols in the data part (data region) of the subframe. This is illustrated at the leftmost downlink (DL)

subframe of FIG. 2: the PDCCH with downlink assignment points at resources in the data region (PDSCH). When PDCCH is used to schedule uplink grants, however, the data region of the subframe is not assigned and applying Micro Sleep Tx feature can reduce e.g. the PA power in the radio. This is illustrated at the right hand side of FIG. 2: in a downlink subframe (middlemost subframe of FIG. 2), a PDCCH with the uplink grant points at resources in a uplink (UL) sub-frame (rightmost UL subframe of FIG. 2) later in time.

Figure 3:
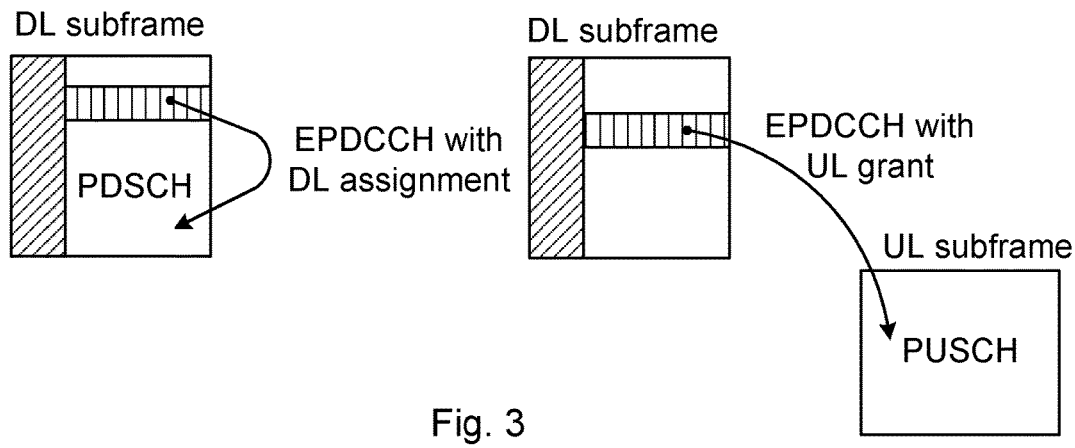
FIG. 3 illustrates use of EPDCCH for downlink assignments and uplink grants.

FIG. 3 illustrates the use of EPDCCH for downlink assignments and uplink grants. When an EPDCCH is used instead of the PDCCH to schedule a UE, the PDSCH will still block activation of the Micro Sleep Tx function when downlink assignments are transmitted. This is illustrated at the left-hand side of FIG. 3: the EPDCCH with downlink assignment points at PDSCH in the same subframe. Likewise, for uplink grants the use of the Micro Sleep Tx feature will be blocked due to the mapping of EPDCCH in the data region of the downlink subframe. This is illustrated at the right-hand side of FIG. 3: the EPDCCH with uplink grant (middlemost subframe of FIG. 3) blocks the use of the Micro Sleep Tx feature in this downlink subframe, and the physical uplink shared channel (PUSCH) in an uplink subframe later in time is also occupied.

Hence EPDCCH prevents the Micro Sleep Tx function also when only UL grants are scheduled in a subframe, which is not the case when PDCCH is used. This will impact the possible eNodeB power savings with Micro Sleep Tx when EPDCCH is introduced. It is important to ensure a high eNodeB energy performance when the control channel EPDCCH is introduced. Accordingly, the present teachings provide, in different embodiments, methods for achieving this. In various embodiments, a solution is to assign EPDCCH resources to EPDCCH capable UEs in dependence on load situation and assigning EPDCCH resources in such a way as to gather the EPDCCH resources as much as possible in time and/or frequency. This enables an energy saving to be made without impacting the service level to the user to any larger extent. A well-balanced tradeoff between energy-efficiency and high user satisfaction is thereby achieved.

Briefly, according to an aspect of the present teachings the time domain is considered when assigning EPDCCH resources by using specific EPDCCH subframe patterns so that scheduling opportunities for a power reduction feature can be utilized more efficiently. The earlier mentioned Micro Sleep Tx feature can be seen as one example of such power reduction feature. This is, in various embodiments, achieved by assigning the EPDCCH opportunities to specific subframes and letting all EDPCCH capable UEs in a cell monitor the same subframe pattern. The Micro Sleep Tx feature can then more easily be utilized during non-EPDCCH subframes while still having the benefit of EPDCCH functionality available in the cell.

Further, when deciding if a subframe should be empty or not during an EPDCCH enabled subframe, having no PDSCH data or EPDCCH assignments scheduled, the downlink as well as the uplink traffic need may be considered for users having EPDCCH resources assigned.

Figure 4:
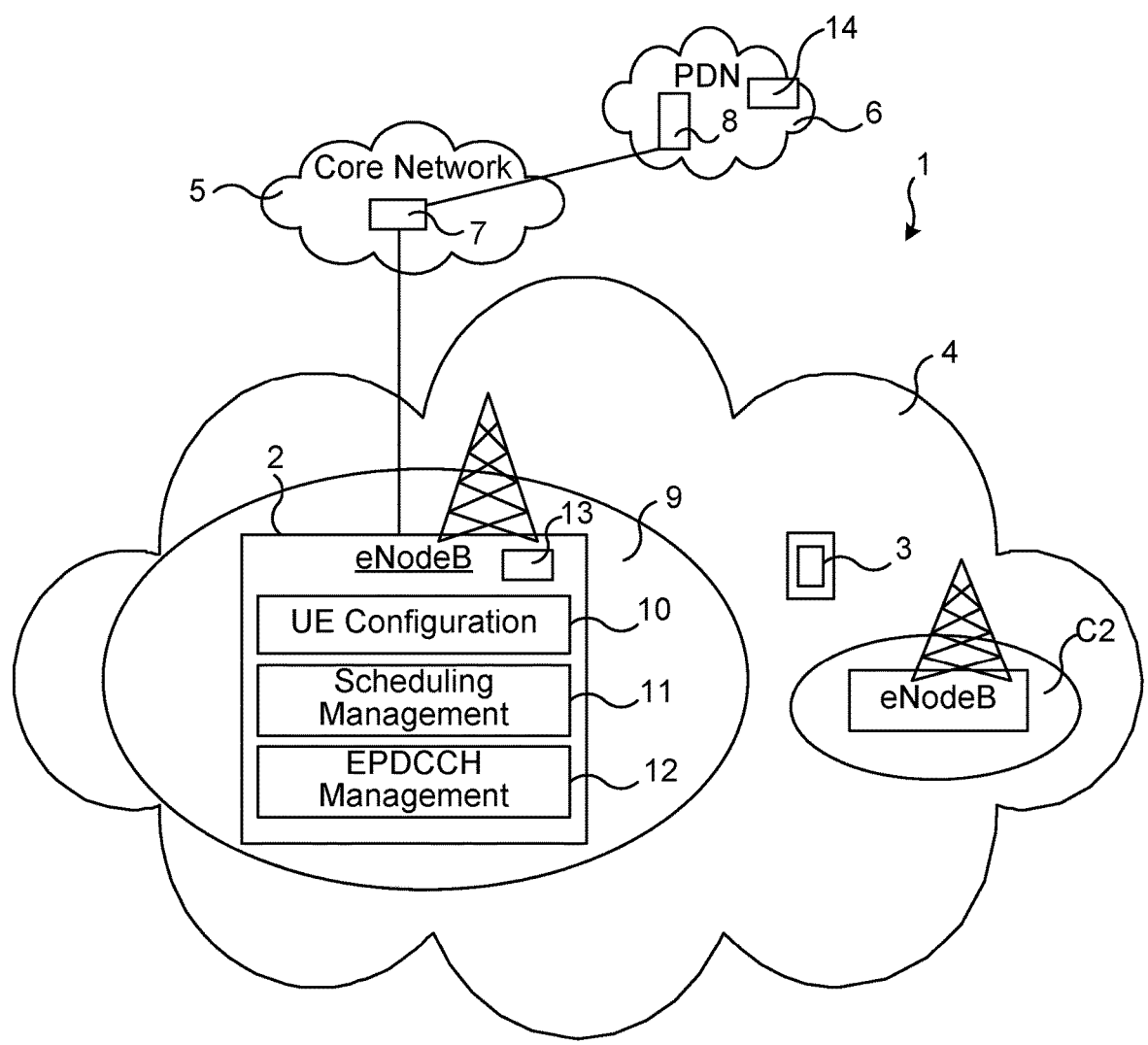
FIG. 4 illustrates schematically an environment in which embodiment according to the present teachings may be implemented.

FIG. 4 illustrates schematically an environment in which embodiments according to the present teachings may be implemented. The communications network 1 comprises a radio access network (RAN) 4, illustrated in the figure as implementing Evolved Universal Terrestrial Radio Access Network (E-UTRAN). The radio access network 4 comprises a number of radio access nodes 2 (denoted eNodeB in LTE), which are interconnected with each other, and able to exchange communication e.g. over an X2 interface.

The radio access nodes 2 provide wireless communication to a number of wireless devices 3, each radio access node 2 providing communication coverage in one or more geographical areas (typically denoted cells). In the FIG. 4, two such cells are indicated: a first cell 9 controlled by a first radio access node 2, and a second cell C2 controlled by a second radio access node. It is noted that each radio access nodes may control several cells. In the following the radio access node 2 is exemplified by eNodeB.

The wireless device 3 may comprise any type of device able to communicate wirelessly with the eNodeB 2, examples of which comprise user devices such as smart phones, laptops, tablet computers etc., or Machine Type Communication (MTC) enabled devices such as e.g. sensors, servers and other devices. The wireless device 3 is also denoted user equipment (UE) in the present disclosure.

The communications network 1 may comprise a core network (CN) 5 comprising nodes such as Mobility Management Entity (MME), serving gateway, etc., such nodes indicated collectively at reference numeral 7. The RAN 4 and the CN 5 may be considered a wireless communications network part, often denoted mobile network, of the communications network 1. The core network 5 may comprise a packet data network gateway (PDN-GW) providing connectivity to an external packet data network (PDN) 6. The packet data network 6 may comprise a cluster of servers (e.g. the Internet), sometimes referred to as a "cloud". One server of such cluster of servers is indicated at reference numeral 8.

FIG. 4 also indicates logical parts of the eNodeB 2 that may be used according to various embodiments according to the present teachings. In particular, the eNodeB 2 may comprise a UE configuration entity 10, a scheduling management entity 11 and an EPDCCH management entity 12 are illustrated.

Information required to implement embodiments of the present teachings, in particular enabling use of the Micro sleep Tx feature even when EPDCCH is used, may be available in the eNodeB 2 or elsewhere in the communications network 1. In the following, and in various embodiments, guidance for how such different pieces of information may be combined to achieve the desired system behavior is provided.

The UE configuration entity 10 may comprise information on whether or not a UE 3, for which the eNodeB 2 is the serving node, is EPDCCH capable or not. The UE configuration entity 10 may also comprise information on EPDCCH assignments; e.g. in case the UE 3 is EPDCCH capable, the UE configuration entity 10 may know if the UE 3 has been assigned EPDCCH resources.

The Scheduling Management entity 11 may comprise information such as e.g. if the UE is monitoring EPDCCH or PDCCH in the next TTI.

The EPDCCH Management entity 12 may comprise a functionality to assign or remove EPDCCH resources of UEs 3.

It is noted that although the entities 10, 11, 12 and their functionalities are illustrated and described as included in the eNodeB 2, they may, in other embodiments, be distributed within the communications network 1, even in the external packet data network 5.

Network entities 13, 14 for implementing various embodiments in accordance with the present teachings are also provided. For instance, the network entities 13, 14 may each implement some or all features of an energy consumption aware scheduling, which will be described later (e.g. in relation to FIG. 5). Again, although illustrated as located in the eNodeB 2 and in the PDN 5, such network entities 13, 14 may be located elsewhere in the communications network 1, e.g. in or as a server of the PDN 6 (the "cloud"), or in a centralized location in the wireless network part (the RAN 4 and the CN 5) of the communications network 1, e.g. in an MME. It is also noted that the methods to be described may be performed in a distributed manner, wherein a first network entity 13 performs certain steps of the method and a second network entity 14 performs certain other steps.

Figure 5:
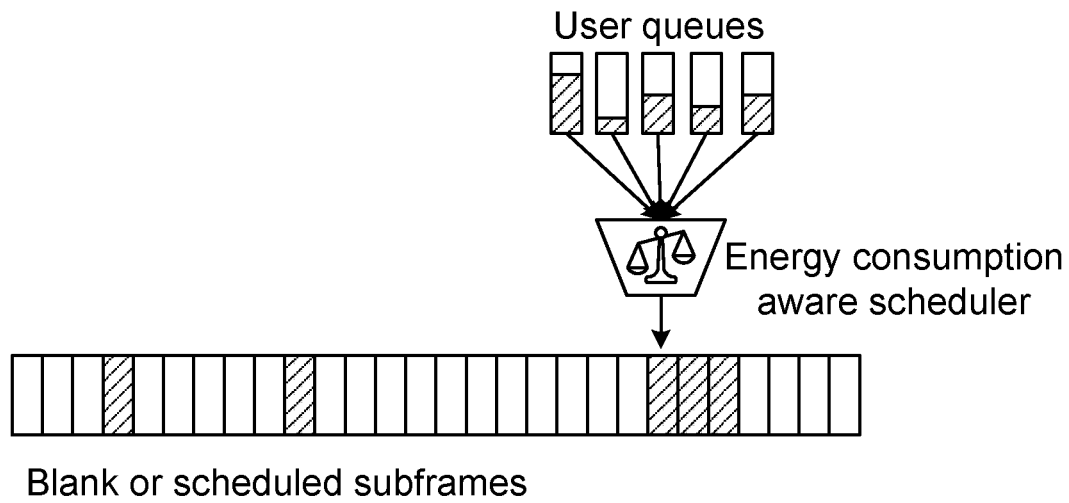
FIG. 5 illustrates a network function for energy consumption aware scheduling.

FIG. 5 illustrates a network function for energy consumption aware scheduling. The energy savings provided by the Micro Sleep Tx feature can be further improved by providing an energy consumption aware scheduler (or other entity) that can decide to avoid scheduling of downlink data traffic when data traffic can be delayed without violating, for instance, any negotiated Quality of Service (QoS) requirements. In this way, the scheduler will try to utilize as much as possible of the frequency spectrum when deciding to schedule a subframe and the rest of the time allow the Micro Sleep Tx feature to be applied.

In FIG. 5 a number of user queues, e.g. users data buffers, are illustrated. The user queues (data buffers) comprise different amounts of data to be sent, from low to high amounts of data. The possible energy consumption savings may be weighed against the user satisfaction. For instance, the respective user's QoS agreements and/or requirements of the services may be taken into consideration when deciding whether or not to schedule data in a subframe. If no user data is scheduled, the energy saving feature could possibly be used. If the statuses of each of the queues (data buffers) is such that scheduling could be postponed without violating any users' QoS then the transmissions can be scheduled to fill certain subframes (scheduled subframes indicated by rectangles with dashed lines in FIG. 5) while leaving other subframes empty (empty subframes indicated by blank rectangles in FIG. 5). This is in contrast to e.g. a strategy of emptying the data buffers as soon as possible, which may increase use satisfaction at the cost of larger energy consumption. By spreading out the transmissions in time over several subframes the energy saving Micro Sleep Tx feature cannot be used as often. A subframe is considered blank when no PDSCH data or any EPDCCH assignments are scheduled. A blank subframe allows Micro Sleep Tx to e.g. power down the PA gate biasing during blank symbols in order to reduce the energy consumption.

Figure 6:
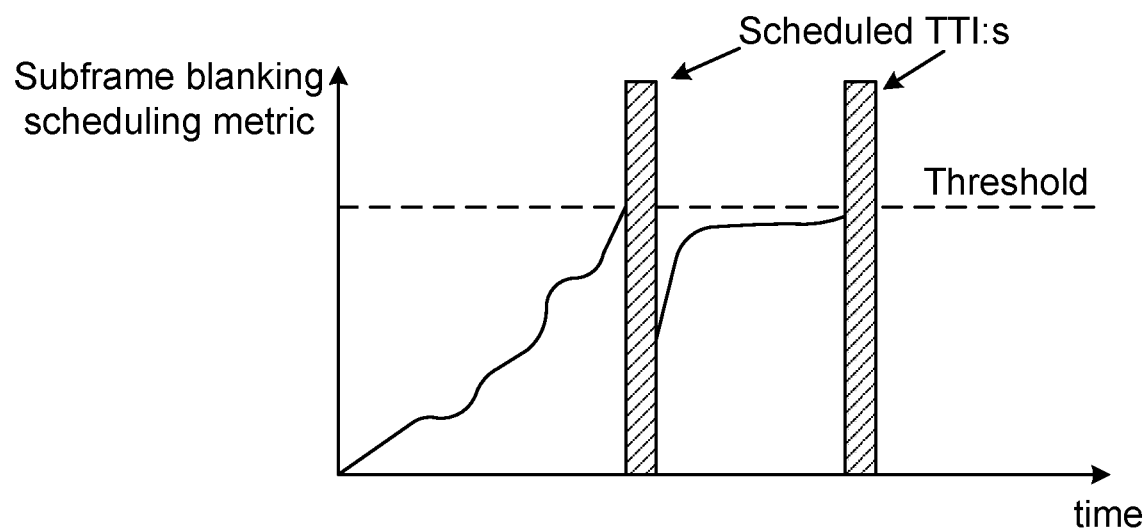
FIG. 6 illustrates subframe blanking scheduling metric.

FIG. 6 illustrates a subframe blanking scheduling metric. This "subframe blanking scheduling metric" (also denoted "blanking scheduling metric" herein) is introduced according to the present teachings and may be used per subframe for deciding whether or not to schedule a subframe. The blanking scheduling metric may be seen as based on the "urgency of scheduling". Such urgency may for instance be measured as "total number of downlink physical resource blocks waiting to be scheduled" or "total number of scheduling entities that are urgent in view of fulfilling a quality of service, QoS, parameter".

The energy consumption aware scheduler (or other entity) may, according to the present teachings, use the subframe blanking scheduling metric in order to determine if the upcoming subframe should be empty, i.e. blank, or if it should be used for scheduling of data traffic. In FIG. 6, the subframe blanking scheduling metric, indicated along the y-axis, is calculated for a cell and compared to a threshold. No scheduling of data traffic will happen as long as the subframe blanking scheduling metric is below the threshold (indicated by horizontal dashed line). When a user's data buffer in the cell reaches a point when e.g. the packet delay budget is getting close to the maximum allowed limit, the subframe blanking scheduling metric will exceed the threshold and the subframe becomes available for scheduling. In FIG. 6, two such occurrences are indicated by "Scheduled TTI:s", wherein TTI is a Transmission Time Interval. The data traffic scheduler (or other entity) will try to utilize the available subframes as efficiently as possible by trying to empty the data buffers for any users with data in the buffer. "Any user" may hence comprise users having data buffers almost full as well as users having data buffers that are almost empty. This behavior will likely prolong the time until the next subframe must be available due to the subframe blanking scheduling metric exceeding the threshold. This will provide more opportunities for Micro Sleep Tx.

Besides the earlier mentioned "subframe blanking scheduling metric", the present teachings also provide a metric denoted "subframe pattern selection metric". The subframe pattern selection metric may be used when an EPDCCH subframe pattern, indicating the EPDCCH resources of a UE, is to be selected for the UE. This may be done when a UE is assigned the EPDCCH resources, for instance when the UE is entering a cell. The subframe pattern selection metric may be based on load in the communications system, e.g. load in the RAN 4. In other embodiments the subframe pattern selection metric may be based on load in a cell 9 (in an eNodeB 2 of the cell 9) of the communications system 1. The load may be established e.g. as "number of EPDCCH enabled UEs" (in system or in cell), "EPDCCH resource utilization" (in system or in cell), or "number of UEs" (in system or in cell).

Figure 7:
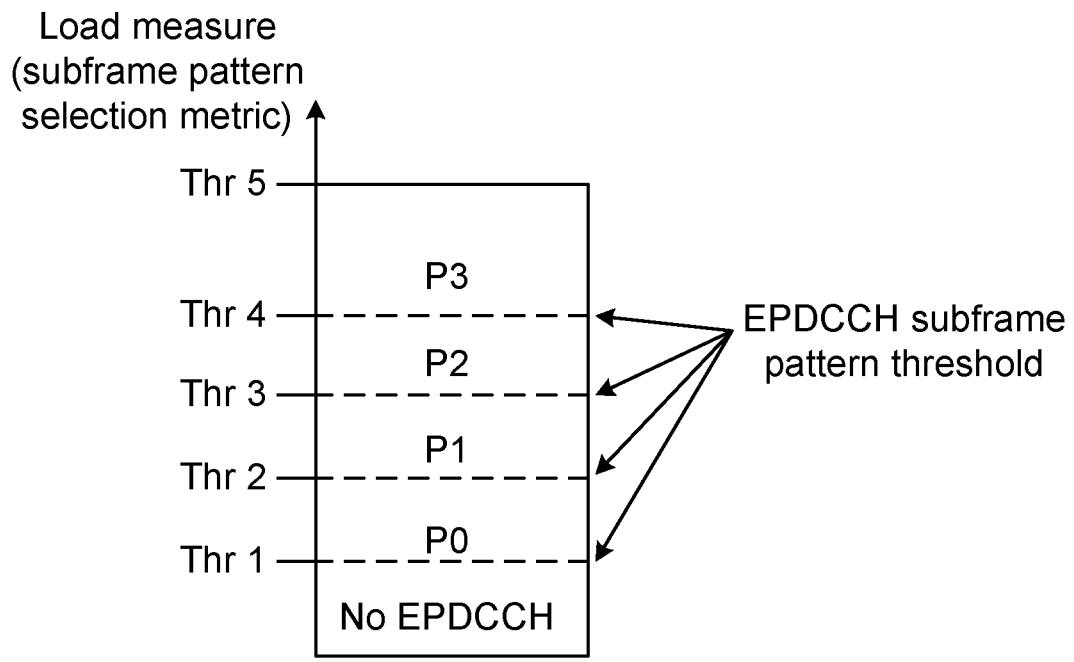
FIG. 7 illustrates exemplary EPDCCH subframe pattern thresholds.

FIG. 7 illustrates exemplary EPDCCH subframe pattern thresholds Thr 1, Thr 2, Thr 3, Thr 4, Thr 5. The thresholds indicates when a particular value of the subframe pattern selection metric is such that a certain EPDCCH subframe pattern should be changed to another EPDCCH subframe pattern. For instance, below a first threshold, Thr 1, no EPDCCH resources at all are assigned, and PDCCH resources are relied on for all UEs 3. When a load based measure, i.e. the subframe pattern selection metric, reaches (or exceeds) the first threshold Thr 1, EPDCCH resources are assigned according to a first pattern P0. As long as the load based measure is within an interval between the first threshold Thr 1 and a second threshold Thr 2, the first pattern P0 is used. When the load based measure reaches and/or exceeds the second threshold Thr 2, a second pattern P1 is used when assigning EPDCCH resources. The UEs 3 having EPDCCH resources assigned according to the first pattern P0 continues monitoring EPDCCH resources according to this first pattern P0. FIG. 7 illustrates five such intervals (first interval [0, Thr] 1, second interval [Thr 1, Thr 2], third interval [Thr 2, Thr 3], fourth interval [Thr 3, Thr 4], fifth interval [Thr 4, Thr 5]) during which different patterns or no pattern are used. It is however noted that the number of thresholds, and hence intervals, may be varied.

According to the present teachings, each EPDCCH capable UE is assigned a subframe pattern, a bitmap, that determines if the UE 3 shall monitor the PDCCH or the EDPCCH for UE specific assignments. If the bitmap is not set during EPDCCH RRC signaling setup, the UE 3 will monitor EPDCCH during all subframes. Setting the bitmap during RRC signaling setup can restrict the EPDCCH occurrences to specific subframes. One example of such setup would be a bitmap of the following type: [1010101010101010101010101010101010] where "1" denotes that the corresponding subframe is used and "0"

that the corresponding subframe is not used. A bitmap of 40 ms cycle duration would instruct the UE 3 to monitor only every second subframe for EPDCCH assignments. The UE 3 shall then monitor the UE specific PDCCH search space during non-EPDCCH subframes. A pattern like this will offer a tradeoff between having low latency for EPDCCH opportunities and at the same time having subframes with only legacy PDCCH and thus better opportunity for Micro Sleep Tx.

Figure 8:
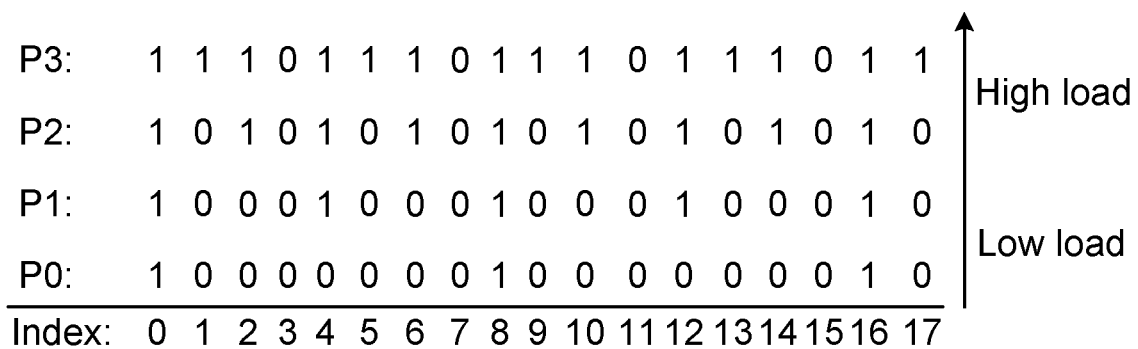
FIG. 8 illustrates exemplary EPDCCH subframe patterns for different loads.

FIG. 8 illustrates exemplary EPDCCH subframe patterns for different loads. Different EPDCCH subframe patterns can be applied at different traffic load, or different resource utilization, as illustrated in FIG. 8. "1" denotes a subframe where EPDCCH is used, while "0" denotes the subframes where EPDCCH is not used. The EPDCCH subframe patterns denoted P0, P1, P2, P3 may for instance correspond to the ones mentioned in relation to FIG. 7.

In the first pattern P0, only every eighth subframe is used, in the second pattern P1, every fourth subframe is used, in the third pattern P2, corresponding to the above mentioned example, every second subframe is used. In the fourth pattern P3 every fourth subframe is not used, i.e. three consecutive subframes are used, then the fourth subframe is not used. The higher the load in the cell is, the more subframes has to be used and the less subframes are candidates during which the Micro sleep Tx feature can be applied.

From an energy efficiency point of view it is more favorable that all (or as many as possible) EPDCCH capable UEs are using the same subframe pattern (in particular EPDCCH subframe pattern). Therefore, in various embodiments according to the present teachings, only a few predefined EPDCCH subframe patterns are used. In this regards, it is further noted that the EPDCCH subframe patterns for a low load (e.g. P0) is preferably a sub-set of the patterns for higher loads (e.g. P1). In the exemplary EPDCCH subframe patterns shown in FIG. 8, the patterns P0, P1, P2 are all subsets of pattern P3 and patterns P0 and P1 are also subsets of pattern P2 etc.

Further, by avoiding switching too often between different EPDCCH subframe patterns the amount of RRC signaling can be kept to a minimum. These aims may for instance be achieved by filtering a resource need in the cell 9 and use hysteresis around each load threshold (e.g. the thresholds Thr 1, Thr 2, Thr 3, Thr 4, Thr 5 mentioned in relation to FIG. 7) to limit the number of state changes. Keeping the number of state changes down also limits the RRC signaling load since less EPDCCH reconfigurations are needed.

The energy consumption aware scheduler (e.g. one or both of the network entities 13, 14) should be informed when EPDCCH capable UEs are configured with a common EPDCCH subframe pattern. As described earlier, each subframe may be marked as an EPDCCH enabled subframe ("1") or a non-EPDCCH subframe ("0"). The network entity 13, 14 (or other entity such as the scheduling management 11) may be arranged to control e.g. when and where PDSCH data will be assigned to UEs and will use the knowledge of the EPDCCH subframe pattern when deciding to use a blank subframe or not.

Figure 9B:
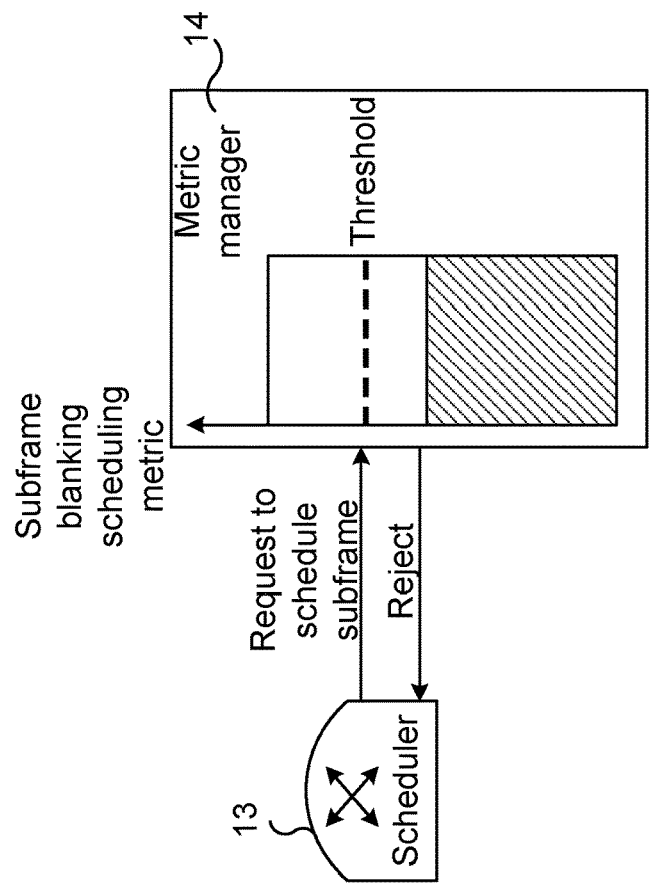
FIGS. 9*a* and 9*b* illustrate two scheduling request cases for different subframe blanking scheduling metrics.
Figure 9A:
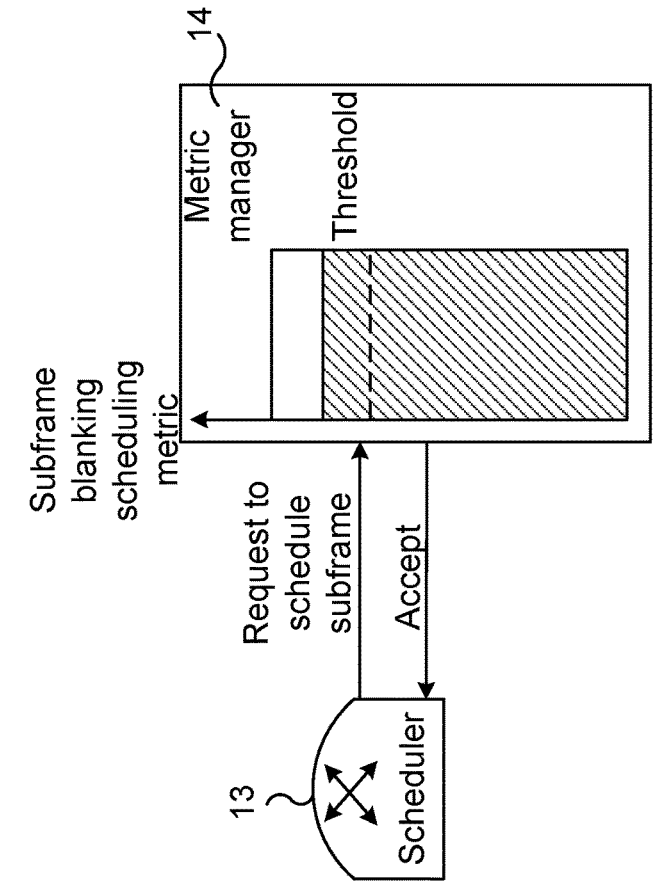

FIGS. 9a and 9b illustrate two scheduling request cases for different subframe blanking scheduling metrics. According to an aspect, and as mentioned earlier, metrics representing the urgency of scheduling in each subframe are considered. The calculation of the urgency of scheduling may be done for any kind of resource, e.g. user data, control data, etc.

For each subframe the subframe blanking scheduling metric is established, e.g. calculated, to indicate the urgency to schedule data for the users. In FIGS. 9a and 9b, the value of the subframe blanking scheduling metric is indicated by the hatched area. A high value of the subframe blanking scheduling metric may indicate a high urgency to schedule, while a low value of the subframe blanking scheduling metric may indicate a low urgency to schedule, as in the FIGS. 9a and 9b. However, it is noted that the reverse could be implemented instead, i.e. a low value of the subframe blanking scheduling metric may indicate a high urgency to schedule, while a high value of the subframe blanking scheduling metric may indicate a low urgency to schedule.

The scheduler or other entity, in FIGS. 9a, 9b exemplified by a first network entity 13 denoted scheduler, may request a permission to schedule data in the subframe. To this end, the scheduler 13 sends a request e.g. to a second network entity 14, which in this case is denoted a metric manager. The metric manager 14 establishes a current subframe blanking scheduling metric based e.g. on load in the cell 9. If the subframe blanking scheduling metric exceeds a threshold (indicated by dashed horizontal line), the subframe is available for scheduling (the urgency is high) and the request is accepted (FIG. 9a). Otherwise, i.e. if the subframe blanking scheduling metric is below the threshold, the request is rejected (FIG. 9b) and the subframe is unavailable for scheduling. In the latter case, FIG. 9b, the Micro Sleep Tx feature may be applied, e.g. by turning off PAs of a transmitter part of the eNodeB 2. The described tasks may be performed in a single network entity 13, 14 or distributed manner involving two or more network entities 13, 14.

The subframe blanking scheduling metric can be calculated in different ways, e.g. as a downlink Physical Resource Block (PRB) metric, which may be an estimate of the total number of downlink PRBs waiting to be scheduled. As another example, the subframe blanking scheduling metric may be calculated based on QoS guarantees and agreements with users. For instance, an estimate can be based on the total number of urgent Scheduling Entities, SE, (e.g. UE-specific DL assignments, System Information Broadcast or Paging) that corresponds to a DL PRB allocation in the same subframe. With "urgent" a scheduling entity is referred to that would risk to e.g. not fulfil the QoS contract for the corresponding bearer if not scheduled. As still another example, the subframe blanking scheduling metric may be based on a combination of measures, e.g. based on number of downlink PRBs waiting to be scheduled and based on reaching guaranteed QoS.

For non-EPDCCH subframes only PDSCH data can be scheduled in the DL PRBs and hence only the PDSCH urgency should be considered.

In view of subframe blanking scheduling strategy during non-EPDCCH subframes the following can be noted. For Micro Sleep Tx, it does not matter if uplink grants are sent on PDCCH or not during a non-EPDCCH subframe. The scheduler 13 (or other entity/entities) therefore only needs to consider the downlink PDSCH traffic in the cell 9 when taking the subframe blanking decision. It should also be more likely to blank a subframe during a non-EPDCCH subframe compared to an EPDCCH enabled subframe since uplink assignment sent on PDCCH does not impair Micro Sleep Tx.

For EPDCCH enabled subframes the DL PRBs can be assigned to both PDSCH and EPDCCH, hence both PDSCH and EPDCCH must be taken into account when the metric is calculated. For the metric of total DL PRB this implies that both PDSCH and EPDCCH PRBs shall be included, and for the case of QoS guarantee metric both SEs resulting in PDSCH and EPDCCH in the subframe must be included.

In view of subframe blanking scheduling strategy during EPDCCH enabled subframes the following can be noted. Micro Sleep Tx will not be possible to utilize during an EPDCCH enabled subframe when either PDSCH data or uplink and/or downlink EPDCCH assignments are scheduled for transmission. However the benefits of EPDCCH, such as ICIC and beamforming, can be utilized for users with configured EPDCCH resources. Compared to the non-EPDCCH subframe it should be less likely to blank an EPDCCH enabled subframe. The decision to blank a subframe shall also consider the uplink scheduling need since the transmission of an uplink EPDCCH assignment would disable Micro Sleep Tx for the entire duration of the subframe.

In summary, the scheduler may use the subframe blanking scheduling metric that consider each user's traffic need to be able to make a subframe blanking decision that does not violate e.g. the negotiated QoS requirements. Some traffic might not suffer very much if scheduling is postponed until a couple of subframes later while other traffic might be latency critical and would need to be scheduled immediately. The scheduler may try to schedule as much data as possible when it has been decided to use a subframe in order to utilize the resources as efficiently as possible. Additionally, the scheduler may consider if the subframe is an EPDCCH enabled subframe or not when deciding to blank a subframe or not.

Figure 10:
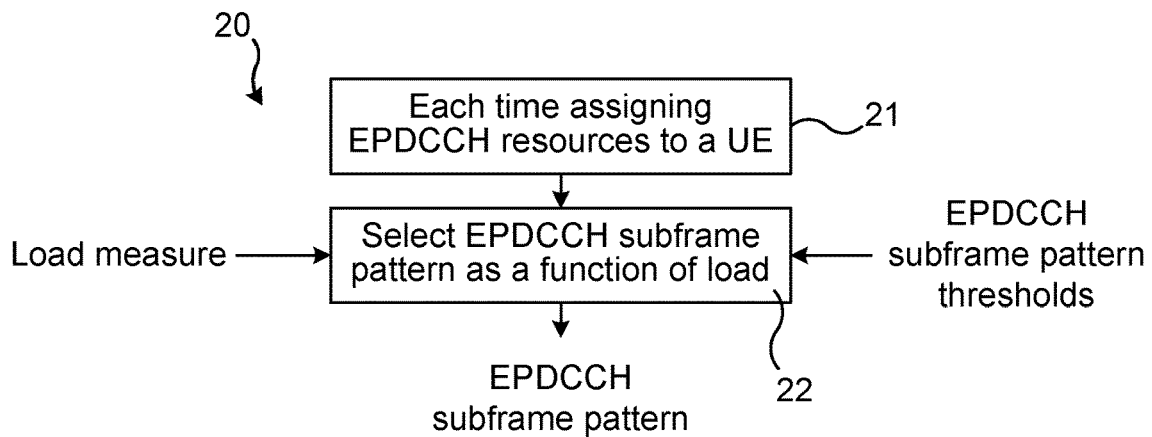
FIG. 10 is a flow chart over steps of a method in accordance with the present teachings.

FIG. 10 is a flow chart over steps of a method 20 in accordance with the present teachings, summarizing some aspects that have been described. In step 21, for each UE 3 and each time EPDCCH resources is to be assigned to the UE 3 the method 20 may be applied. In step 22, an EPDCCH subframe pattern is obtained. The EPDCCH subframe pattern may for instance be selected as a function of load in a cell 9 in which the UE 3 is served. As has been described, the subframe blanking scheduling metric may be used for deciding if a subframe is EPDCCH enabled or not. If this decision is "yes", then the subframe blanking scheduling metric should take into account EPDCCH transmissions. The selection of EPDCCH subframe pattern may be based on load in the cell 9, e.g. by selecting a particular first EPDCCH subframe pattern if the load is within a certain range. The EPDCCH subframe pattern that is obtained in this way is then used when assigning the EPDCCH resources to the UE 3.

Figure 11:
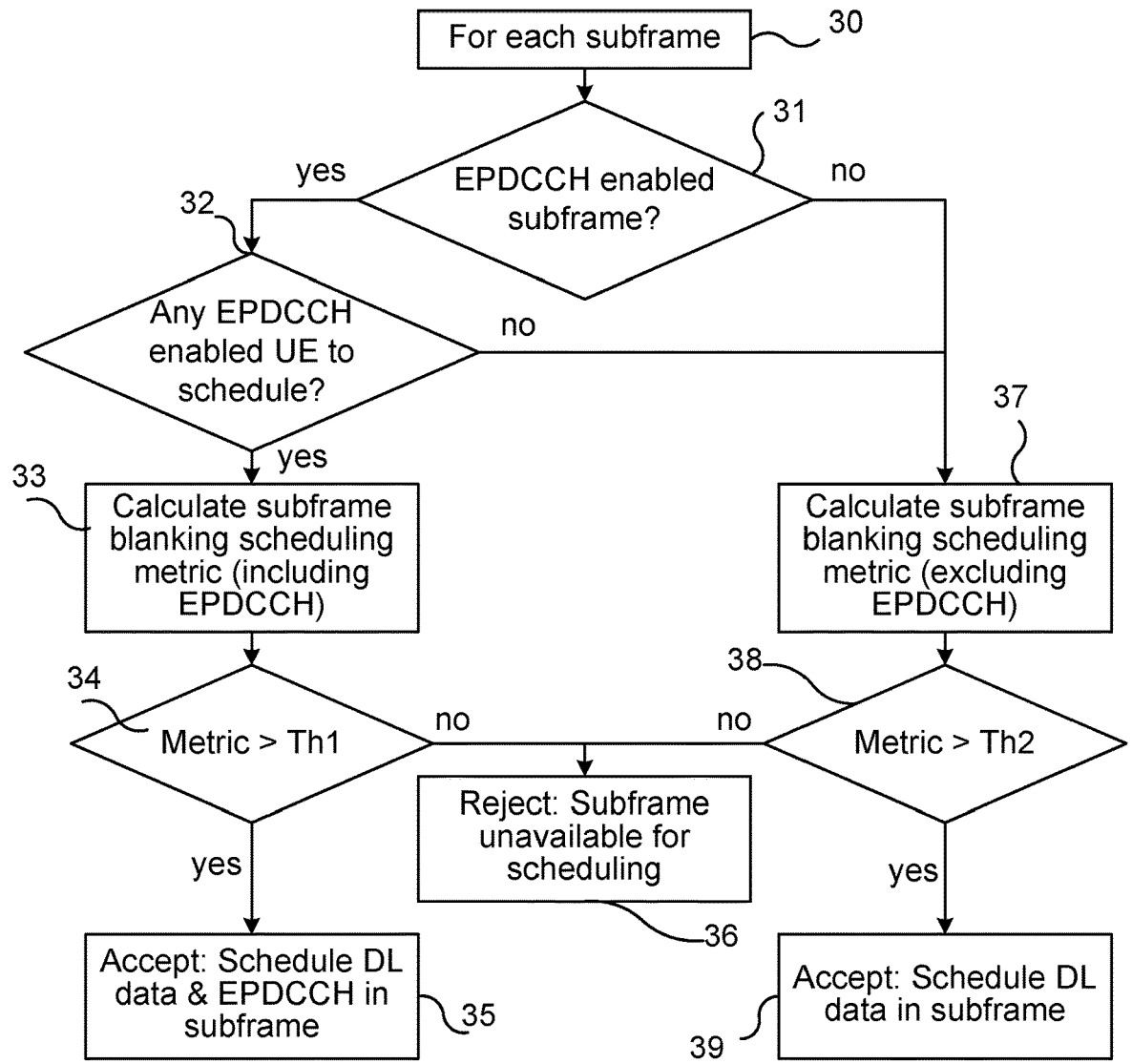
FIG. 11 is a flow chart over steps of a method in accordance with the present teachings.

FIG. 11 is a flow chart over steps of a method in accordance with the present teachings. The flowchart illustrates the subframe blanking scheduling flow.

The method may be performed for each subframe (box 30). In decision box 31, it is decided if the subframe is an EPDCCH enabled subframe. If yes, flow continues to decision box 32. In decision box 32, it is decided if there is any EPDCCH enabled UE to be scheduled. If yes, then flow continues to box 33.

In box 33, a subframe blanking scheduling metric is established (e.g. calculated). Since the UE 3 is EPDCCH enabled, consideration has to be paid to PDSCH data and uplink and/or downlink EPDCCH assignments when establishing the subframe blanking scheduling metric and deciding whether or not to blank the subframe.

Next, in decision box 34, it is decided if the subframe blanking scheduling metric exceeds (or, in some embodiments, is equal to or higher than) a first threshold Th1. If the subframe blanking scheduling metric exceeds the first threshold Th1, then flow continues to box 35, wherein downlink data and EPDCCH are scheduled in the subframe.

If, in box 34, the subframe blanking scheduling metric does not exceed the first threshold Th1, then flow continues to box 36, wherein the subframe is made unavailable for scheduling and hence available for applying the Micro Sleep Tx feature.

If in decision box 31 it is decided that the subframe is not an EPDCCH enabled subframe, or if, in decision box 32 it is decided that there is no EPDCCH enabled UE to be scheduled, then flow continues to box 37.

In box 37, a subframe blanking scheduling metric is established (e.g. calculated). Since the subframe is not EPDCCH enabled, consideration only has to be paid to PDSCH data when establishing the subframe blanking scheduling metric and deciding whether or not to blank the subframe.

Next, in decision box 38, it is decided if the subframe blanking scheduling metric exceeds (or, in some embodiments, is equal to or higher than) a second threshold Th2. If the subframe blanking scheduling metric exceeds the second threshold Th2, then flow continues to box 39, wherein downlink data is scheduled in the subframe.

If, in box 38, the subframe blanking scheduling metric does not exceed the second threshold Th2, then flow continues to box 36, wherein the subframe is made unavailable for scheduling and hence available for applying the Micro Sleep Tx feature.

It is noted that the first threshold Th1 and the second threshold Th2 may be different. Different thresholds may be used depending on if the subframe is EPDCCH enabled or not. As mentioned earlier, it should be less likely to decide to blank a subframe in box 34 than in box 38, since for the EPDCCH enabled case, in addition to the consideration to PDSCH also EPDCCH must be considered. The EPDCCH enabled case must thus additionally include tentative uplink transmissions in the subframe blanking scheduling metric The various features and embodiments that have been described may be combined in different ways, examples of which are given in the following, with reference first to FIG. 12.

Figure 12:
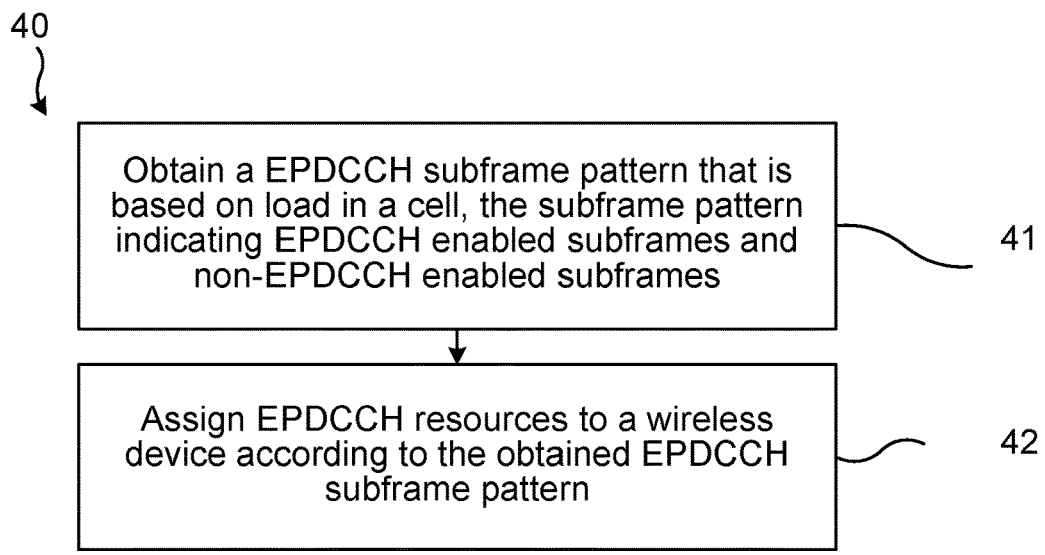
FIG. 12 is a flow chart over steps of a method in accordance with the present teachings.

FIG. 12 is a flow chart over steps of a method in accordance with the present teachings. The method 40 may be performed in a communications network 1 in a distributed manner or in a single network entity 13, 14 of the communications network 1, for assigning, in a cell 9, enhanced physical downlink control channel, EPDCCH, resources used in the communications network 1 (in particular a wireless communications network 4, 5) for transmitting scheduling assignments.

The method 40 comprises obtaining 41 a EPDCCH subframe pattern that is based on load in the cell 9, wherein the subframe pattern indicates EPDCCH enabled subframes and non-EPDCCH enabled subframes.

The method 40 comprises assigning 42 EPDCCH resources to a wireless device 3 according to the obtained EPDCCH subframe pattern.

The EPDCCH subframe pattern based on load may be established (e.g. calculated) in a network entity different than a network entity performing the assigning. The obtaining may comprise receiving the EPDCCH subframe pattern from another network entity or network node than the network entity performing the assigning. In other embodiments, the obtaining comprises requesting the EPDCCH subframe pattern from another network entity or network node. In still other embodiments, the obtaining comprises establishing the EPDCCH subframe pattern within the same network entity 13, 14 that assigns the EPDCCH resources.

In an embodiment, the obtaining 41 comprises:
establishing a subframe pattern selection metric, the subframe pattern selection metric being based on load and/or need in the cell 9, and
selecting the EPDCCH subframe pattern based on the established subframe pattern selection metric.

"Need" in the cell 9 may, for instance, be established based on QoS requirements of EPDCCH enabled wireless devices within the cell 9. For instance, an EPCCH enabled wireless device currently using PDCCH resources might have difficulties receiving a certain service at an agreed upon QoS. The need in the cell 9 might then be such that more EPDCCH resources are needed and hence another EPDCCH subframe pattern should be selected.

The establishing the subframe pattern selection metric may be performed in one network entity, while the selecting may be performed in another network entity. The establishing may hence comprise receiving, in the network entity performing the selecting, the subframe pattern selection metric from another network entity or network node, or it may comprise establishing it, e.g. by estimations, in the network entity 13, 14 also performing the selecting. Having the subframe pattern selection metric, the network entity 13, 14 may select a particular EPDCCH subframe pattern for the wireless device 3, e.g. according to what is described in relation to FIGS. 6, 7 and 8.

As mentioned earlier, the method 40 may be performed in a distributed manner. The assigning 42 may for instance be performed in the eNodeB 2, while the establishing the subframe pattern selection metric and selecting the EPDCCH subframe pattern based thereon may be performed in a network entity 14 in the PDN 5. Various ways of performing the method 40 in a distributed manner is thus conceivable.

In variations of the above embodiment, the establishing the subframe pattern selection metric comprises calculating an estimate based on one or more of: the total number of EPDCCH enabled wireless devices 3 in the cell 9, the total EPDCCH resource utilization in the cell 9, the total number of wireless devices 3 in the cell 9, Quality of Service requirements of each EPDCCH enabled wireless devices in the cell 9 and basing the subframe pattern selection metric on the estimate. The QoS requirements of the EPDCCH enabled wireless devices in the cell 9, and the fulfilment of these requirements, may be seen as an indication on need in the cell for a particular subframe pattern selection. EPDCCH enabled wireless devices with high QoS requirements would indicate a need for a subframe pattern with many EPDCCH enabled subframes.

In some embodiments, the selecting the EPDCCH subframe pattern comprises selecting a first subframe pattern for each EPDCCH enabled wireless device 3 as long as the subframe pattern selection metric has a value within a first interval.

In some embodiments, the method 40 may comprise, when the subframe pattern selection metric reaches a value outside the first interval, selecting a second subframe pattern for each subsequently assigned EPDCCH enabled wireless device 3.

In various embodiments, the method comprises:
establishing a blanking scheduling metric for each subframe, the blanking scheduling metric being based on urgency of scheduling in the cell 9, and
deciding, based on the blanking scheduling metric whether or not to blank the subframe.

The blanking scheduling metric may, for instance, comprises calculating an estimate on total number of downlink physical resource blocks waiting to be scheduled or an estimate on total number of scheduling entities that are urgent in view of fulfilling a quality of service, QoS, parameter and basing the blanking scheduling metric on the estimate.

In some embodiments, the establishing the blanking scheduling metric comprises calculating, for non-EPDCCH enabled subframes, the blanking scheduling metric in view only of urgency of Physical Downlink Shared Channel, PDSCH, traffic.

In some embodiments, the establishing the blanking scheduling metric comprises calculating, for EPDCCH enabled subframes, the blanking scheduling metric in view of urgency of Physical Downlink Shared Channel, PDSCH, traffic and EPDCCH traffic.

In some embodiments, the method 40 comprises powering down one or more devices used in relation to transmissions during subframes decided to be blanked. If the method 40 is performed in a single network entity 13, 14, the network entity 13, 14 may execute also such powering down itself or instruct another network node or network entity to effectuate such powering down.

In various embodiments, a first EPDCCH subframe pattern corresponding to a first subframe pattern selection metric is a subset of a second EPDCCH subframe pattern corresponding to a second subframe pattern selection metric, wherein the second subframe pattern selection metric indicates a higher load in the cell 9 (and/or need in the cell) than the first subframe pattern selection metric. Using the same EPDCCH subframe pattern for as many wireless devices as possible is advantageous in that the EPDCCH resources are then clustered in time and the possibility of blanking of subframes is thereby facilitated, which in turn enables power savings by e.g. turning off PAs of transmitter parts.

In an embodiment, the method 40 is performed in a (single) network entity 13, 14 of the communications network 1. In other embodiments, the method 40 is performed in a distributed manner involving two or more network entities 13, 14.

It is noted that as EPDCCH is a main candidate for the downlink control channel for massive MTC in the LTE evolution track (and possibly also in the 5G NX track) the subframe pattern scheme according to various embodiments according to the present teachings is also applicable for 5G.

Figure 13:
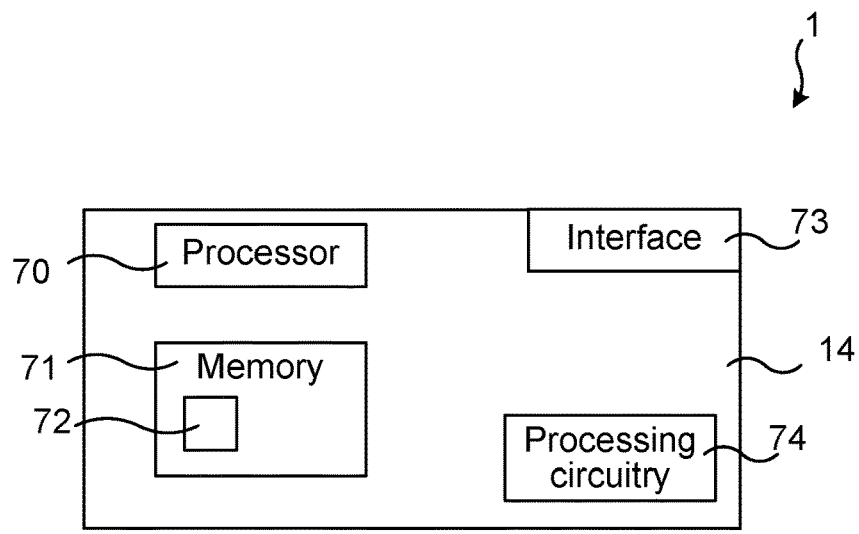
FIG. 13 illustrates schematically a network node of a communications network and means for implementing embodiments according to the present teachings.
Figure 13:
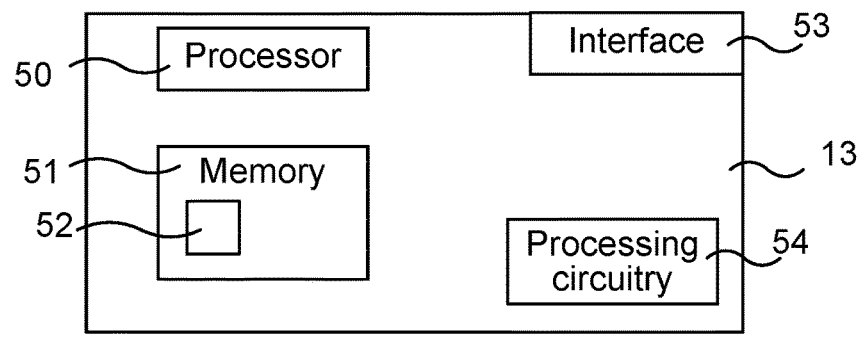

FIG. 13 illustrates schematically the communications network 1 of FIG. 4, the communications network 1 comprising one or more network entities 13, 14 and means for implementing embodiments according to the present teachings.

Each of the network entities 13, 14 comprises a processor 50, 70 comprising any combination of one or more of a central processing unit (CPU), multiprocessor, microcontroller, digital signal processor (DSP), application specific integrated circuit etc. capable of executing software instructions stored in a memory 51, 71 which can thus be a computer program product 51, 71. The processor 50, 70 can be configured to execute any of the various embodiments of the method for instance as described in relation to FIG. 12.

The memory 51, 71 can be any combination of read and write memory (RAM) and read only memory (ROM), Flash memory, magnetic tape, Compact Disc (CD)-ROM, digital versatile disc (DVD), Blu-ray disc etc. The memory 51, 71 may also comprise persistent storage, which, for example, can be any single one or combination of magnetic memory, optical memory, solid state memory or even remotely mounted memory.

The network entities 13, 14 may also comprises an interface 53, 73 for instance an input/output device for communicating with other network entities. Such interface 53, 73 may comprise a wireless communication interface (e.g. radio interface) and/or a wired communication interface.

The network entities 13, 14 of the communications network 1 may also comprise additional processing circuitry, schematically indicated at reference numeral 54, 74 for implementing the various embodiments according to the present teachings.

The present teachings provide computer programs 52, 72 for the communications network 1, e.g. for the network entities 13, 14 thereof. The computer program 52, 72 comprises computer program code, which, when executed on at least one processor 50, 70 of the communications network 1 causes the communications network 1 to perform the method 40 according to any of the described embodiments thereof.

The present disclosure also encompasses computer program products 51, 71 comprising a computer program 52, 72 for implementing the embodiments of the method as described, and a computer readable means on which the computer program 52, 72 is stored. The computer program product 51, 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

A the communications network 1 is provided for assigning, in a cell 9, enhanced physical downlink control channel, EPDCCH, resources used in a communications network 1 (in particular a wireless communications network 4, 5) for transmitting scheduling assignments. The communications network 1 (e.g. one or more network entities 13, 14 thereof) is configured to:
  obtain a EPDCCH subframe pattern that is based on load in the cell 9, wherein the subframe pattern indicates EPDCCH enabled subframes and non-EPDCCH enabled subframes, and
  assign EPDCCH resources to a wireless device 3 according to the obtained EPDCCH subframe pattern.

The communications network 1 may be configured to perform the above steps e.g. by comprising one or more processors 50, 70 and memory 51, 71 the memory 51, 71 containing instructions executable by the processor 50, 70 whereby the communications network 1 is operative to perform the steps. In case of several processors 50, 70 they may be configured to perform all steps of the method 40 or only some of the steps. The processors 50, 70 may hence be configured to perform different steps of the method 40.

In an embodiment, the communications network 1 is configured to obtain the EPDCCH subframe pattern by:
  establishing a subframe pattern selection metric, the subframe pattern selection metric being based on load and/or need in the cell 9, and
  selecting the EPDCCH subframe pattern based on the established subframe pattern selection metric.

In an embodiment, the communications network 1 is configured to establish the subframe pattern selection metric by calculating an estimate based on one or more of: the total number of EPDCCH enabled wireless devices 3 in the cell 9, the total EPDCCH resource utilization in the cell 9, the total number of wireless devices 3 in the cell 9, Quality of Service requirements of each EPDCCH enabled wireless devices in the cell 9 and basing the subframe pattern selection metric on the estimate.

In an embodiment, the communications network 1 is configured to select the EPDCCH subframe pattern by selecting a first subframe pattern for each EPDCCH enabled wireless device 3 as long as the subframe pattern selection metric has a value within a first interval.

In an embodiment, the communications network 1 is configured to, when the subframe pattern selection metric reaches a value outside the first interval, select a second subframe pattern for each subsequently assigned EPDCCH enabled wireless device 3.

In an embodiment, the communications network 1 is configured to:
  establish a blanking scheduling metric for each subframe, the blanking scheduling metric being based on urgency of scheduling in the cell 9, and
  decide, based on the blanking scheduling metric whether or not to blank the subframe.

In an embodiment, the communications network 1 is configured to establish the blanking scheduling metric by calculating, for non-EPDCCH enabled subframes, the blanking scheduling metric in view only of urgency of Physical Downlink Shared Channel, PDSCH, traffic.

In an embodiment, the communications network 1 is configured to establish the blanking scheduling metric by calculating, for EPDCCH enabled subframes, the blanking scheduling metric in view of urgency of Physical Downlink Shared Channel, PDSCH, traffic and EPDCCH traffic.

In an embodiment, the communications network 1 is configured to power down one or more devices used in relation to transmissions during subframes decided to be blanked.

In various embodiments, a first EPDCCH subframe pattern corresponding to a first subframe pattern selection metric is a subset of a second EPDCCH subframe pattern corresponding to a second subframe pattern selection metric, wherein the second subframe pattern selection metric indicates a higher load in the cell 9 than the first subframe pattern selection metric.

In an embodiment, the communications network 1 comprises a (single) network entity 13, 14 configured to perform any of the embodiments of the method 40.

Figure 14:
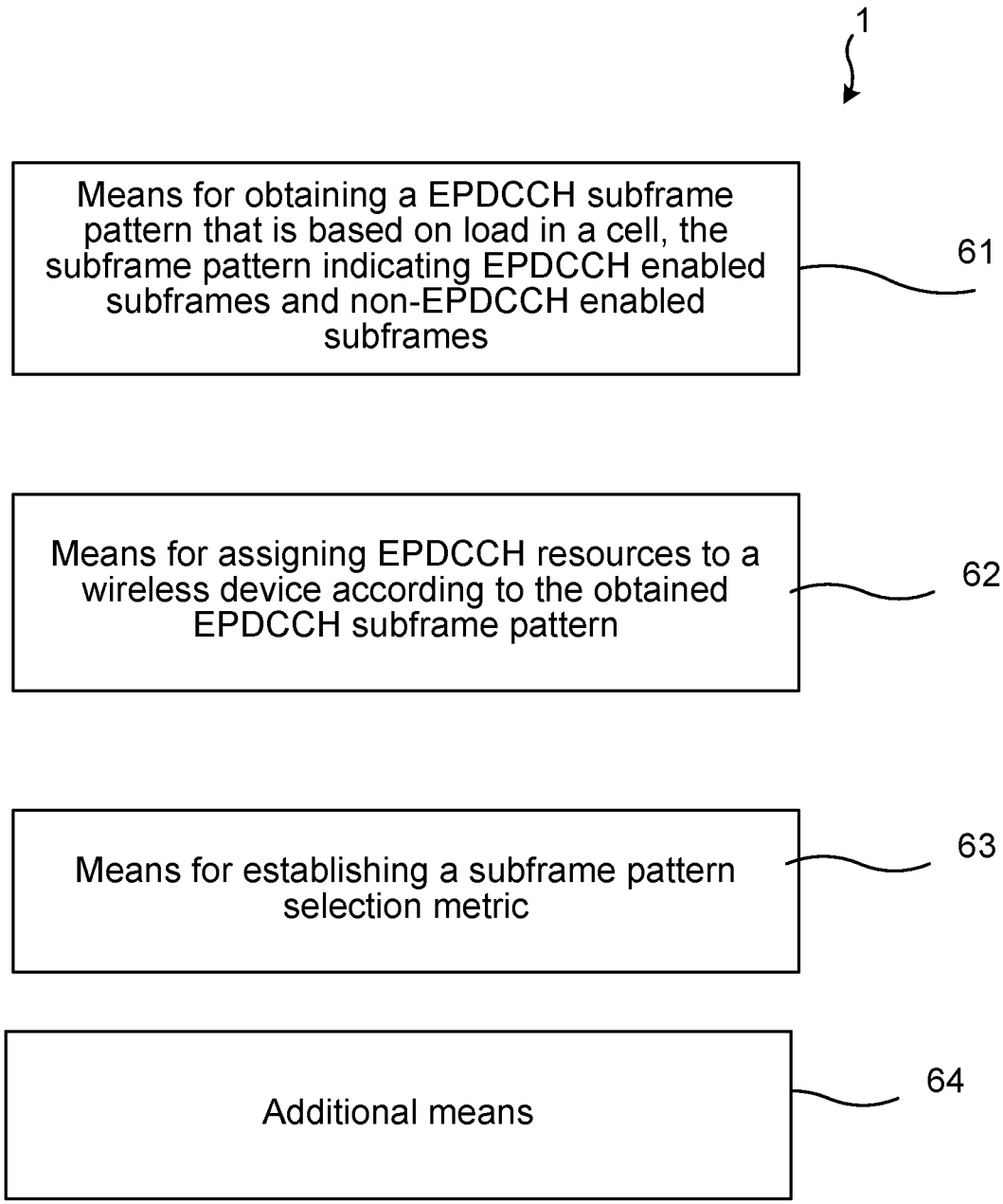
FIG. 14 illustrates a network node comprising function modules/software modules for implementing embodiments according to the present teachings.

FIG. 14 illustrates a communications network 1 comprising function modules/software modules for implementing embodiments according to the present teachings.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

In an aspect, a communications network is provided for assigning, in a cell, enhanced physical downlink control channel, EPDCCH, resources. Such EPDCCH resources may be used in a communications network for transmitting scheduling assignments. The communications network comprises first means 61 for obtaining a EPDCCH subframe pattern that is based on load in the cell, wherein the subframe pattern indicates EPDCCH enabled subframes and non-EPDCCH enabled subframes. Such first means 61 may comprise processing circuitry adapted for such obtaining, e.g. processing circuitry 54, 74 and/or interface 53, 73 as described in relation to FIG. 13 adapted for such obtaining.

The communications network comprises second means 62 for assigning EPDCCH resources to a wireless device according to the obtained EPDCCH subframe pattern. Such second means 62 may comprise processing circuitry adapted for such assigning.

The communications network comprises third means 63 for establishing a subframe pattern selection metric, the subframe pattern selection metric being based on load in the cell. Such third means 63 may comprise processing circuitry adapted for such establishing, e.g. processing circuitry 54, 74 as described in relation to FIG. 13 adapted for such establishing.

The communications network may comprise still further means, as indicated at reference numeral 63, for implementing the various steps and variations of the steps according to the present teachings. Such additional means may comprise processing circuitry suitable adapted and/or analog processing means and/or digital processing means or any combination thereof.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a communications network for assigning, in a cell, Enhanced Physical Downlink Control Channel (EPDCCH) resources used in the communications network for transmitting scheduling assignments, the method comprising:
    obtaining an EPDCCH subframe pattern that is based on load in the cell, wherein the EPDCCH subframe pattern indicates EPDCCH enabled subframes and non-EPDCCH enabled subframes, wherein the obtaining comprises selecting the EPDCCH subframe pattern based on a subframe pattern selection metric, and wherein selecting the EPDCCH subframe pattern comprises:
        in response to the subframe pattern selection metric having a value within a first interval, selecting a first EPDCCH subframe pattern for each EPDCCH enabled wireless device, wherein the first interval is between a first threshold and a second threshold, and
        in response to the subframe pattern selection metric reaching a value outside the first interval, selecting a second EPDCCH subframe pattern for each subsequently assigned EPDCCH enabled wireless device, wherein the value outside the first interval corresponds to a second interval between the second threshold and a third threshold;
    assigning the EPDCCH resources to the EPDCCH enabled wireless device according to the obtained EPDCCH subframe pattern;
    establishing a blanking scheduling metric for each subframe, the blanking scheduling metric being based on urgency of scheduling in the cell, wherein the establishing the blanking scheduling metric comprises calculating an estimation of a number of downlink physical resource blocks waiting to be scheduled;
    deciding, based on a comparison of the blanking scheduling metric with a fourth threshold, whether or not to blank the subframe; and
    turning off one or more devices used in relation to transmissions during subframes decided to be blanked.

2. The method of claim 1, wherein the obtaining further comprises:
    establishing the subframe pattern selection metric, the subframe pattern selection metric being based on the load and/or need in the cell.

3. The method of claim 2, wherein the establishing the subframe pattern selection metric comprises:
    calculating an estimate based on one or more of:
        a total number of EPDCCH enabled wireless devices in the cell;
        a total EPDCCH resource utilization in the cell;
        a total number of wireless devices in the cell; and
        Quality of Service requirements of each EPDCCH enabled wireless device in the cell; and
    basing the subframe pattern selection metric on the estimate.

4. The method of claim 1, wherein the establishing the blanking scheduling metric comprises calculating, for the non-EPDCCH enabled subframes, the blanking scheduling metric in view of urgency of Physical Downlink Shared Channel traffic.

5. The method of claim 1, wherein the establishing the blanking scheduling metric comprises calculating, for the EPDCCH enabled subframes, the blanking scheduling metric in view of urgency of Physical Downlink Shared Channel traffic and EPDCCH traffic.

6. The method of claim 1:
    wherein the subframe pattern selection metric is a first subframe selection metric,
    wherein the first EPDCCH subframe pattern corresponding to the first subframe pattern selection metric is a subset of the second EPDCCH subframe pattern corresponding to a second subframe pattern selection metric, and
    wherein the second subframe pattern selection metric indicates a higher load in the cell than the first subframe pattern selection metric.

7. The method of claim 1, wherein the method is performed in a network entity of the communications network.

8. A non-transitory computer readable recording medium storing a computer program product for assigning, in a cell of a communications network, Enhanced Physical Downlink Control Channel (EPDCCH) resources used in the communications network for transmitting scheduling assignments, the computer program product comprising software instructions which, when run on processing circuitry of the communications network, cause the communications network to:
    obtain an EPDCCH subframe pattern that is based on load in the cell, wherein the EPDCCH subframe pattern indicates EPDCCH enabled subframes and non-EPDCCH enabled subframes, wherein the EPDCCH subframe pattern is obtained by selecting the EPDCCH subframe pattern based on a subframe pattern selection metric, and wherein the EPDCCH subframe pattern is selected by:
        in response to the subframe pattern selection metric having a value within a first interval, selecting a first EPDCCH subframe pattern for each EPDCCH enabled wireless device, wherein the first interval is between a first threshold and a second threshold, and
        in response to the subframe pattern selection metric reaching a value outside the first interval, selecting a second EPDCCH subframe pattern for each subsequently assigned EPDCCH enabled wireless device, wherein the value outside the first interval corresponds to a second interval between the second threshold and a third threshold;

assign the EPDCCH resources to the EPDCCH enabled wireless device according to the obtained EPDCCH subframe pattern;

establish a blanking scheduling metric for each subframe, the blanking scheduling metric being based on urgency of scheduling in the cell, wherein to establish the blanking scheduling metric, the software instructions cause the communications network to calculate an estimation of a number of downlink physical resource blocks waiting to be scheduled;

decide, based on a comparison of the blanking scheduling metric with a fourth threshold, whether or not to blank the subframe; and turn off one or more devices used in relation to transmissions during subframes decided to be blanked.

9. A communications network for assigning, in a cell, Enhanced Physical Downlink Control Channel (EPDCCH) resources used in a communications network for transmitting scheduling assignments, the communications network comprising:

processing circuitry; and memory containing instructions executable by the processing circuitry whereby the communications network is operative to:

obtain an EPDCCH subframe pattern that is based on load in the cell, wherein the EPDCCH subframe pattern indicates EPDCCH enabled subframes and non-EPDCCH enabled subframes, wherein the communications network is operative to obtain the EPDCCH subframe pattern by selecting the EPDCCH subframe pattern based on a subframe pattern selection metric, and wherein the EPDCCH subframe pattern is selected by:

in response to the subframe pattern selection metric having a value within a first interval, selecting a first EPDCCH subframe pattern for each EPDCCH enabled wireless device, wherein the first interval is between a first threshold and a second threshold, and in response to the subframe pattern selection metric reaching a value outside the first interval, selecting a second EPDCCH subframe pattern for each subsequently assigned EPDCCH enabled wireless device, wherein the value outside the first interval corresponds to a second interval between the second threshold and a third threshold;

assign the EPDCCH resources to the EPDCCH enabled wireless device according to the obtained EPDCCH subframe pattern;

establish a blanking scheduling metric for each subframe, the blanking scheduling metric being based on urgency of scheduling in the cell, wherein the instructions are such that the communications network is operative to establish the blanking scheduling metric by calculating an estimation of a number of downlink physical resource blocks waiting to be scheduled;

decide, based on a comparison of the blanking scheduling metric with a fourth threshold, whether or not to blank the subframe; and turn off one or more devices used in relation to transmissions during subframes decided to be blanked.

10. The communications network of claim 9, wherein the instructions are such that the communications network is further operative to obtain the EPDCCH subframe pattern by:

establishing the subframe pattern selection metric, the subframe pattern selection metric being based on the load and/or need in the cell.

11. The communications network of claim 10, wherein the instructions are such that the communications network is operative to establish the subframe pattern selection metric by:

calculating an estimate based on one or more of:
a total number of EPDCCH enabled wireless devices in the cell;
a total EPDCCH resource utilization in the cell;
a total number of wireless devices in the cell; and
Quality of Service requirements of each EPDCCH enabled wireless device in the cell; and basing the subframe pattern selection metric on the estimate.

12. The communications network of claim 9, wherein the instructions are such that the communications network is operative to establish the blanking scheduling metric by calculating, for the non-EPDCCH enabled subframes, the blanking scheduling metric in view of urgency of Physical Downlink Shared Channel traffic.

13. The communications network of claim 9, wherein the instructions are such that the communications network is operative to establish the blanking scheduling metric by calculating, for the EPDCCH enabled subframes, the blanking scheduling metric in view of urgency of Physical Downlink Shared Channel traffic and EPDCCH traffic.

14. The communications network of claim 9:
wherein the subframe pattern selection metric is a first subframe selection metric,
wherein the first EPDCCH subframe pattern corresponding to the first subframe pattern selection metric is a subset of the second EPDCCH subframe pattern corresponding to a second subframe pattern selection metric, and
wherein the second subframe pattern selection metric indicates a higher load in the cell than the first subframe pattern selection metric.

15. The communications network of claim 9, wherein the processing circuitry is a portion of a network entity of the communications network.

* * * * *